Patented Jan. 26, 1926.

1,571,074

UNITED STATES PATENT OFFICE.

HARRY S. THATCHER, OF LOS ANGELES, CALIFORNIA, ASSIGNOR, BY MESNE ASSIGNMENTS, TO THE CELITE COMPANY, A CORPORATION OF DELAWARE.

RECOVERED INORGANIC FILTER AID AND PROCESS OF PRODUCING THE SAME.

No Drawing.     Application filed January 24, 1923. Serial No. 614,707.

*To all whom it may concern:*

Be it known that I, HARRY S. THATCHER, a citizen of the United States, residing at Los Angeles, in the county of Los Angeles and State of California, have invented a Recovered Inorganic Filter Aid and Process of Producing the Same, of which the following is a specification.

The object of this invention is the recovery, in condition for reuse, of diatomaceous earth and other inorganic materials used in accelerating filtration of liquors.

The use of such inorganic aids to filtration is widespread. In the sugar industry, for example, it is the custom to mix raw sugar, diatomaceous earth and water in the proportions of two thousand pounds sugar, about seven pounds diatomaceous earth and thirteen hundred pounds of water. When the solution of the sugar is complete, the liquor is pumped through a pressure filter. Here the diatomaceous earth is collected, with suspended matter originally present in the sugar, to give a more or less pervious filter cake. When the cake has become so thick that the rate of filtration is very slow, the press is drained; the filter cake is removed from the press and treated with water to remove as much as possible of the sugar contained in the filter cake; the diatomaceous earth, now nearly free of sugar, is discarded.

Many attempts have been made to recover, for reuse, this diatomaceous earth or other aid used in the filtration. Usually, the recovery process has consisted essentially in calcining the used filter-aid, such as diatomaceous earth, to carbonize or burn off entirely the organic impurities. Such attempts have not been successful as evidenced by the fact that many manufacturers have abandoned equipment once installed for recovery purposes.

I have discovered the reason for some of the difficulty which these previous investigators have experienced, and I have found also simple but effective means of overcoming the difficulty.

When wet diatomaceous earth, for example, is calcined, hard lumps are formed. The colloidal silica present in the wet diatomaceous earth acts as a high temperature bond. When such bonding action has been produced, it is impracticable later to disintegrate the hard lumps into individual diatoms, and it is the diatom skeleton which is important in accelerating filtration. When the highly bonded pieces of calcined wet diatomaceous earth are milled, one of two things happens either the lumps are not disintegrated sufficiently, or if the disintegration is carried to the ultimate limit, the diatoms are fractured very badly.

I have found that this difficulty may be avoided entirely if the diatomaceous earth is first freed from water or dried to a suitable extent and then disintegrated of reduced by grinding or milling to a condition of powder or fine division, for example, approximately to individual diatoms, and is then calcined at a suitable temperature, preferably at about 1800° F. The preliminary drying and the reduction to a condition of fine division are both important in producing a material of the desired efficiency as a filtration accelerator or filter-aid. The pre-drying facilitates the grinding and it is likely that it dehydrates or destroys much of the colloidal silica or silicic acid present in the filter cake. Whatever the changes actually produced by the drying and grinding previous to calcining, I have found that such pre-drying and pre-grinding have an advantageous effect as illustrated in the following example of the application of my new process: A sample of diatomaceous earth which had been used in filtering raw Hawaiian sugar at a San Francisco refinery was heated in a muffle furnace up to 1800° F., at which temperature it was maintained for one hour. The material removed from the muffle was then ground as thoroughly as possible in a Williams swing hammer mill. A test of it was then made to determine its efficiency as a filtration accelerator. It was mixed with 60° Brix raw sugar solution in the proportion of sixteen pounds for each 3300 pounds of sugar solution. The temperature was maintained at 80° C. and the mixture forced through a pressure filter, the pressure on the solution being varied from ten pounds at the start to forty pounds, according to a regular schedule. In one half hour there was filtered 3.7 gallons of filtrate, calculated for each square foot of filtering area. The procedure was now repeated with the important exception that the diatomaceous earth from the sugar refinery was first thoroughly dried at 284° F. and then milled in the Williams swing hammer mill previous to calcining. As before, the temperature in the muffle was raised to 1800° F., and maintained at that point for one hour. The proportion of recovered diatomaceous earth to sugar, the temperature of filtration, the schedule of pressure increases during the filtration test, and all other conditions with the single exception noted above, were maintained the same. In this case, however, I obtained a rate of filtration which was 179% that obtained with the diatomaceous earth which had not been disintegrated after drying and previous to calcining. In other words, I obtained in this experiment 6.65 gallons filtrate per square foot of filter area, during a thirty minute filtration test. It is a remarkable fact that the used diatomaceous earth filter-cake, dried and ground before calcination, showed a higher filtration rate than the fresh diatomaceous earth originally used as a filter-aid from which the filter-cake was formed that was used in making the recovered filter-aid.

A second difficulty which has been experienced in previous attempts to recover the diatomaceous earth for reuse in filtering sugar solutions is the presence of inorganic salts in the recovered diatomaceous earth due to accumulation of such salts in the press cake during filtration. Instead of calcining, in my process, at temperatures just sufficient to burn out the organic material, I calcine at temperatures sufficiently high to remove, by volatilization, or by combining with the silica, a large part of the inorganic impurities also. It is well known that sodium chloride and potassium chloride, for example, begin to volatilize at temperatures as low as 1700° F. This rate of volatilization is increased in the presence of diatomaceous earth, which absorbs the melted chlorides in its highly porous structure and thereby exposes exceptionally large surfaces from which the hot chlorides may evaporate. Further, the calcium salts which are found in sugar press cake are first decomposed by high temperatures, such as I use, and then combined with the silica, of which diatomaceous earth is chiefly composed, to give insoluble calcium silicate, for example. To illustrate the above point, we have the following typical data; a sample of diatomaceous earth used in the filter press of a sugar refinery was found to contain 0.93 pounds of soluble inorganic materials (ash after ignition of recovered product on evaporation of aqueous extract) for each one hundred pounds of dried filter cake. By heating this dried filter cake to the preferred temperature, 1800° F. I have actually reduced this amount of water soluble inorganic material to less than one-third what it was originally, that is, to 0.28 pounds.

The sugar industry especially is not able to use diatomaceous earth containing large quantities of soluble inorganic impurities. It has been found that each pound of inorganic material introduced into the sugar refiner's liquors, increases the non-crystallizable sugar in the molasses by five pounds.

While I have referred to the use of a muffle furnace, I may use a rotary calciner in which the diatomaceous earth to be recovered is heated by an internal oil, coal or gas fire, or I may use any other of the numerous types of calciners or roasters in commercial use. I have given as the preferred temperature, 1800° F. Temperatures up to 2400° F. are not objectionable as long as the filtration accelerator being recovered does not fuse or clinker together at such temperature. A lower temperature than 1800° F. may be used, although the efficiency of the accelerator and the extent of purification from inorganic impurities decreases as the temperature is lowered appreciably below 1800° F.

I have found that the incorporation of such chemicals as sodium chloride aids also in improving the filtration efficiency of the recovered diatomaceous earth, the reason being presumably that it increases the purity and the structural change of the particles and eliminates soluble salts. The salt may be incorporated with the material in solution, or in finely divided form, before calcination of the mixture. As the mixture of salt and diatomaceous earth is heated, the salt first melts into the pores of the diatomaceous earth, later it vaporizes as proven by analysis of the original and of the calcined mixture. The vapor escaping from the pores of the kieselguhr may open wider such pores. Also, the hot vapor in contact with the diatomaceous earth promotes fusion and in such a partial fusion, the fine particles of clay and the finest particles of the silica will fuse prior to the fusion of the larger diatom skeletons. In other words, the salt changes or destroys a considerable part of the fine dust or clay which retards filtration of liquors through the earth.

Various other metallic salts or compounds may be used in place of the sodium chloride, for example, calcium chloride, magnesium chloride, or any chloride or halide of any alkali metal or alkaline earth metal, or other salts, which produce the desired result, namely, an increase in the efficiency of the product as a filter-aid, and any of such salts may be used either singly or in combination.

In carrying out the process with the addition of sodium chloride or other salts, the several steps of pre-drying, grinding and milling to a pulverized condition and calcination at a temperature of about 1800° F. (or at least above 1500° F.) are followed as above described, the salt being added previous to the calcination, for example, during the grinding operation.

What I claim is:

1. The process of recovering an inorganic filter-aid after use in filtration which consists in drying the filter-cake containing such filter-aid, then finely dividing it, and then calcining the disintegrated material at a temperature sufficiently high to remove part of the inorganic impurities.

2. The process of recovering diatomaceous earth after use in filtration which consists in drying the filter press cake containing such diatomaceous earth, then finely dividing it, and then calcining the disintegrated material to reduce the amount of inorganic impurities.

3. The process as set forth in claim 2, the calcination being carried out in the presence of an added salt of an alkali-forming metal.

4. A material adapted for use in filtration consisting of an inorganic filter-aid produced by first drying, then finely dividing, and then finally calcining filter cake resulting from filtering operations and containing such filter aid to remove part of the inorganic impurities therefrom.

5. A material adapted for use as a filter-aid which consists of diatomaceous earth obtained by drying, then finely dividing, and then calcining filter cake resulting from filtering operations and containing such diatomaceous earth to remove part of the inorganic impurities therefrom.

6. The herein described process of recovering diatomaceous earth from spent filter press residue containing such earth; said process consisting in first drying such residue, then reducing the dried residue to a condition of fine division; and finally calcining the finely divided dried residue by subjecting it to a temperature of approximately 1800° F. to produce an effective filter aid.

7. A new article of commerce consisting of diatomaceous earth derived from spent filter press residue containing such earth; by first drying such residue, then reducing it to a condition of fine division; and finally calcining the finely divided dried residue by subjecting it to a temperature of approximately 1800° F.

In testimony whereof I have hereunto subscribed my name this 19th day of January 1923.

HARRY S. THATCHER.